United States Patent
Ng

[15] 3,660,113
[45] May 2, 1972

[54] PROCESS FOR PRODUCING POTATO CHIPS

[72] Inventor: Keng Chock Ng, 1020 Merced Street, Berkeley, Calif. 94707

[22] Filed: Jan. 26, 1970

[21] Appl. No.: 5,966

[52] U.S. Cl. ................................99/100 P, 99/103, 99/193
[51] Int. Cl. ..........................................A23l 1/12, A23b 7/04
[58] Field of Search ............................99/100, 103, 193, 207

[56] References Cited

UNITED STATES PATENTS

| | | | |
|---|---|---|---|
| 2,597,065 | 5/1952 | Chase | 99/193 |
| 2,597,067 | 5/1952 | Chase | 99/100 |
| 2,707,684 | 5/1955 | McCready | 99/207 |
| 3,175,914 | 3/1965 | Vahlsing | 99/100 |
| 3,355,299 | 11/1967 | McLaughlin | 99/193 |
| 3,397,993 | 8/1968 | Strong | 99/193 |
| 3,484,252 | 12/1969 | Popeil | 99/193 |
| 2,983,619 | 5/1961 | Sbaw | 99/193 |

*Primary Examiner*—Norman Yudkoff
*Assistant Examiner*—Martin G. Mullen
*Attorney*—Eckhoff and Hoppe

[57] ABSTRACT

Fried potato particles, frequently identified as potato chips or French fries, are prepared having an acceptable color, one from Color 4 through 7 of the Color Reference Standard of the International Potato Chip Institute by a method comprising freezing raw sliced potatoes followed immediately thereafter by thawing said slices in warm water and frying the thus treated slices.

2 Claims, No Drawings

PROCESS FOR PRODUCING POTATO CHIPS

BACKGROUND OF THE INVENTION

It has long been recognized that potatoes having a substantial reducing sugar content produce an undesirable color when deep fat fried in particle forms. The problem provided by reducing sugars is particularly present when the potatoes have been stored at a low temperature as is frequently the case. It has been proposed to treat such potato particles with various chemicals, such as calcium or magnesium salt solutions, various organic acid, an aqueous solution containing sulfur dioxide, a solution of common salt and sodium citrate, various sugar solutions and a sodium bisulfite solution.

SUMMARY OF THE INVENTION

I have found that by freezing the potato particles under such conditions that ice crystals form in the individual cells and so rupture the cells, due to the increase in size resulting from freezing of the water present, and thereafter thawing the potato particles in warm water, the cell contents released upon cell rupture and thereafter frying the particles, the particles are reduced in color by two or three units on the aforementioned International Potato Chip Institute Color Reference Standard as compared to fried particles which have not been so prepared.

It is in general the broad object of the present invention to provide an improved process for treating potato particles before frying, particularly those produced from potatoes which have been stored at a low temperature.

Another object of the invention is to produce deep fat fried potato particles from potato tubers of low specific gravity and having a high reducing sugar content.

A further object of the invention is to produce light and uniformly colored deep fat fried potato products regardless of the variety of the potato tubers or the time of the year.

The invention includes other objects and features of advantage, some of which, together with the foregoing, will appear hereinafter wherein the preferred process of this invention is disclosed.

DESCRIPTION OF THE PREFERRED EMBODIMENT

In one embodiment typical of the present invention, potato tubers which had been stored at a low temperature were peeled and washed in the usual manner. The potatoes were then sliced and washed free of the starch released. The washed particles were then subjected to a temperature of between 0° and 25° F. for a time sufficient to freeze the potatoes. This can be achieved by a cold air blast, application of liquid nitrogen or freon in any other suitable manner. Immediately after freezing, the frozen particles were immersed in warm water at a temperature between 90° and 120° F. for from 1 to 3 minutes, the temperature and time being sufficient to thaw the potatoes. Simultaneously, the cellular content of the ruptured cells in the potato slice was released during thawing. To effect this, the wash water used for thawing was changed constantly. After thawing, the particles were then fried under the usual frying conditions at a temperature between 350° and 375° F. in a frying oil. Upon completion of the process, it was found that the color of the product had been improved from two to three units on the Color Reference Standard as compared to those of a control lot which had not been subject to the process steps of this invention.

From the foregoing, I believe it will be apparent that I have provided a novel, simple and improved process for the treatment of potato slices, particularly those produced from potatoes which have been subjected to cold storage and which have a high reducing sugar content and low specific gravity.

I claim:

1. A method of treating sliced potatoes, the natural sugar content of which is such that the desired color change cannot be attached when the slices are cooked by frying which method comprises freezing the raw sliced potatoes to form ice crystals in the cells of the potatoes and so rupture the cells, immediately thereafter, thawing the potatoes in warm water to melt the ice crystals and extract the contents of cells which were ruptured upon formation of the ice crystals, and frying the thus treated slices in a frying medium at a temperature in the range of 350° – 375° F.

2. The method of claim 1 wherein the particles are frozen at a temperature between 0° and 25° F. and thereafter the slices are thawed in water at a temperature between 90° and 120° F. for from 1 to 3 minutes.

* * * * *